Jan. 11, 1955  A. N. IKNAYAN  2,699,194
SAFETY TYPE INNER TUBE
Filed April 5, 1950  3 Sheets-Sheet 2
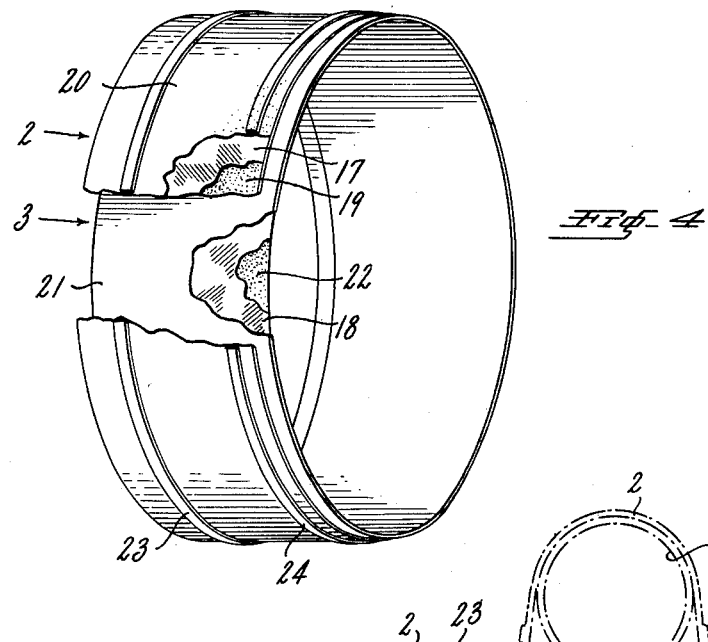
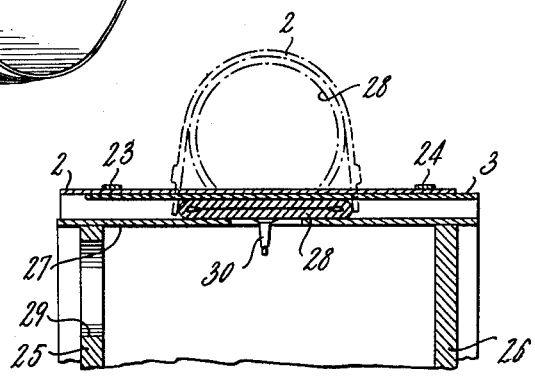
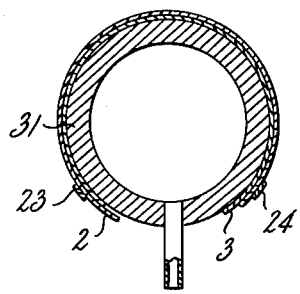
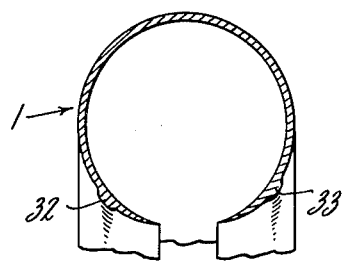
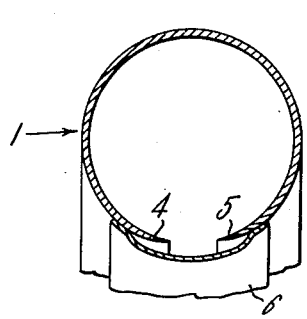
INVENTOR.
ALFRED N. IKNAYAN
BY Henry P. Truesdell
ATTORNEY

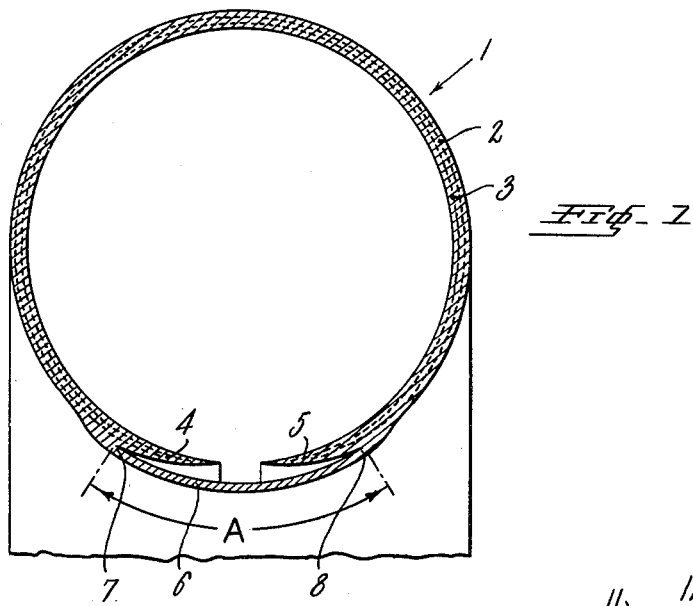
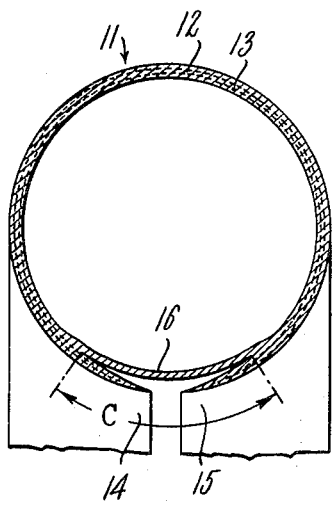
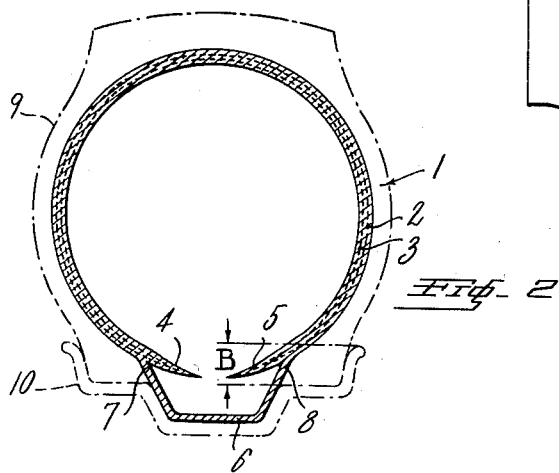

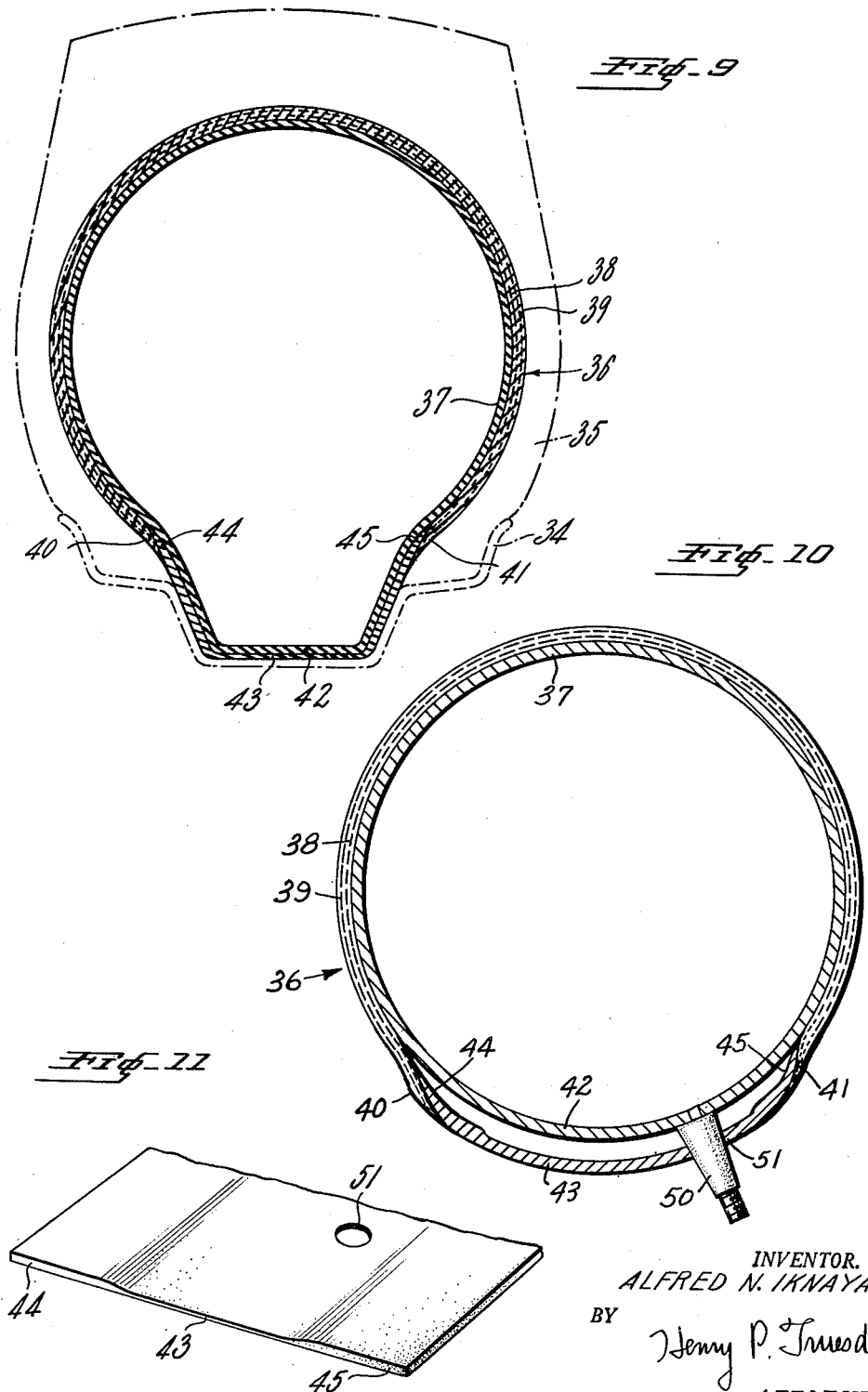

United States Patent Office 2,699,194
Patented Jan. 11, 1955

2,699,194

SAFETY TYPE INNER TUBE

Alfred N. Iknayan, Indianapolis, Ind., assignor to United States Rubber Company, New York, N. Y., a corporation of New Jersey Application April 5, 1950, Serial No. 154,177

4 Claims. (Cl. 152—350)

This invention relates to inner tubes and, more particularly, it relates to a safety type of inner tube in which the inner tube includes reinforcing cords for the purpose of increasing the strength and rigidity of the tube wall, thereby supplementing the strength of the tire carcass with which the inner tube is associated.

This application is a continuation-in-part of my application Serial No. 290, filed January 2, 1948 assigned to the same assignee as the instant application, and now abandoned.

In the operation of automotive vehicles, the hazard of blowouts and quick deflations of pneumatic tires is becoming increasingly dangerous. Due to the high speed at which automotive vehicles are driven and due to the increased horsepower of the engines for driving the vehicles, the performance expected of tires is constantly increasing. It is difficult to provide a pneumatic tire which is blowout-proof. Furthermore, tires frequently receive serious injury in their operation due to one of many causes such as using improper inflation pressures or riding over objects which produce undue distortions to the carcass. Such injuries or weak spots in the carcass are not readily apparent even upon careful inspection.

In accordance with the practice of my invention, I provide an inner tube having strain resisting elements and which is capable of fortifying a pneumatic tire so as to constitute an added reinforcement as an insurance against failure.

It is recognized that various types of safety tubes have been tried out and that even the most successful of the tubes heretofore used commercially do not provide a desired insurance against sudden deflation. It is also recognized that greater strength may be imparted to a tire carcass by providing a carcass having a greater number of plies. Such additional plies, however, are not particularly satisfactory because any rupture or break in the carcass tends to move progressively throughout the thickness of the carcass regardless of the number of plies. Consequently, an increase in carcass thickness is not the whole answer to increased protection. I have found, however, that such increased protection to the carcass may be obtained by utilizing increased plies which are separate and not united as a unit to the carcass. As a result of the use of such a separate unit, a break in the carcass may progress through the entire carcass but will not readily proceed through a separate unit which to some extent is self-adjusting within the casing and assumes its own strain resisting characteristics.

I provide an inner tube, the principal walls of which include strain resisting elements and which in combination includes an extensible portion which permits the inner tube to expand and fill out the entire chamber as defined by the interior of the tire casing and the rim with which it is associated. I have also found that the junction between the extensible portion of the inner tube and the inextensible portion must lie within a critical region relative to the tire assembly in order that the benefits of the improved tube may be attained. Still further, I have found that the junction between the extensible and inextensible portion should be located along the wall of the inextensible portion to allow relatively free ends of the inextensible portion to serve as relief for the strain resisting elements within the inextensible portion.

It is recognized that heretofore certain inner liners have been used between the tire carcass and the conventional inner tube. The present invention differs from such a construction in that it is objectionable to place a free or floating liner between the inner tube and the casing because of its tendency to creep as the tire is rotated and because it includes terminating edges which usually lie in the flexing zone of the tire, thereby causing differential movements which result in chafing and eventual failure of the inner tube.

Another object of my invention is to provide an inner tube which even in a severe break in the carcass of the pneumatic tire will tend to bridge the break and prevent a blowout. Under such conditions a tire is substantially damaged and a definite thumping noise will be apparent to the operator so that the vehicle may be stopped and the tire inspected. Under these conditions the tire remains fully inflated and may be driven substantial distances before chafing will become so extensive as to cause failure of the inner tube. After such eventuality, it has been found that the tube will still deflate slowly thus overcoming the danger of sudden deflation.

Still another object of my invention is the provision of an inner tube having unusual mechanical strength without having unduly increased heat build-up characteristics.

A further object is to provide a strong inner tube having exceptional resistance to air leakage.

These and other objects and advantages will appear more fully in the following detailed description when considered in connection with the accompanying drawing in which:

Fig. 1 is a transverse view, in section, of an inner tube embodying my invention;

Fig. 2 is a transverse view, in section, of the inner tube illustrated in an inflated condition and shown in relative position with a tire casing and rim;

Fig. 3 is a transverse view, in section, of an inner tube illustrating a modified form of my invention;

Fig. 4 is a perspective view, partly in section, of a band of rubberized plies illustrating the first operation in the method of making the inner tube of my invention;

Fig. 5 is a transverse view, in section, of a portion of an apparatus upon which the plies forming the band are shaped;

Fig. 6 is a transverse view, in section, showing the shaped plies in association with a curing bag;

Fig. 7 is a transverse view, in section, of the shaped plies after the curing operation;

Fig. 8 is a transverse view, in section, of the cured plies shown in assembled relation with an uncured strip of rubber forming the extensible portion of the inner tube;

Fig. 9 is a transverse view, in section, of a further modified inner tube illustrated in an inflated condition and shown in relative position with a tire casing and rim;

Fig. 10 is a transverse view, in section, of the modified inner tube of Fig. 9 as it appears before mounting in the tire casing; and Fig. 11 is a perspective view of a portion of the modified tube assembly of Fig. 9.

The walls form, in effect, a crown wall supporting the tread area of the tire casing, the side walls supporting the side portions of the casing.

With reference to the drawing and in particular to Fig. 1, I show an embodiment of my invention in the form of an inner tube 1 having features as hereinafter described. Essentially, the inner tube 1 comprises a plurality of plies, preferably two plies 2 and 3, of rubberized fabric vulcanized so as to form an annulus or circular tube. In cross section, however, the walls forming the rubberized plies 2 and 3 do not necessarily form a complete circle but terminate in ends 4 and 5 which are usually left essentially free forming less than a complete circle. The rubberized fabric plies may be composed of natural rubber, or synthetic rubber, such as butyl rubber, or may even be composed partly of natural rubber and partly of synthetic rubber. In some cases the plies 2 and 3 may comprise coatings or layers of flexible materials other than rubber, such as plasticized nylon, plasticized polyvinyl chloride, polymerized alkyl acrylate, etc., to impart improved resistance to air leakage, such layers being used in place of, or in addition to, natural or synthetic rubber layers. A rim strip 6 of extensible composition which forms, in effect, a base wall, joins the walls of the plies 2 and 3 together to form a completely enclosed air chamber. The strip 6 may be composed of suitable elastic, extensible composition such as natural rubber, butyl rubber etc., and may be of the same composition as the rubber in the plies 2 and 3, or may be of a different composition.

The junctions 7 and 8 between the strip 6 and the outer wall of the inner tube 1 are located in spaced relation from the free ends 4 and 5, respectively. It will be apparent that in this arrangement the strip 6, which constitutes the central base wall of the tube, is joined at its ends to the sidewall at definite junctions 7 and 8. Also, the opposite free ends 4 and 5 of the inextensible reinforcing plies may be considered to constitute extension portions that are essentially free of direct attachment to the base wall, from a point beginning at the junctions 7 and 8 and extending to the terminal ends of the continuations 4 and 5. The free end portions 4 and 5 may therefore be regarded as joined to the base wall or strip 6 only at the junctions 7 and 8 where the portion that may be termed the base wall ends and merges with the portions that may be termed the sidewalls. The distance between these junctions as defined by the letter "A" is equal to approximately 20% of the circumferential distance cross-sectionally around the inner tube. This distance represents a measurement taken on the inner tube when it is unmounted and inflated merely sufficiently to expand the tube to circular shape without any substantial distortion of the tube. While the distance "A" has been stated to be equal to approximately 20% of the cross-sectional circumference of the inner tube, it has also been found that good results may be obtained by maintaining this dimension within a range of from 13% to 27%.

The inner tube 1 composed of the strain resisting plies 2 and 3 is intended to be of such dimensions that it will fit closely with the interior of the tire casing with which it is intended for assembly. In other words, the inner tube with slight inflation will completely fill the cavity of the tire casing without any substantial strain on the plies 2 and 3 constituting the principal portion of the inner tube 1. It is to be understood that a conventional valve assembly (not shown) is intended to be used with the inner tube and in particular in association with the rim strip 6.

Fig. 2 illustrates the inner tube in assembled relation with a tire 9 and a rim 10. This tube is shown under normal operating inflation pressure. Under such conditions the rim portion 6 expands into the well of the rim 10 while the remaining portion of the tube lies against the inner wall of the casing in a substantially undistorted or unstretched condition. It will be noted in Fig. 2 that the locations of the junctions 7 and 8 defining the meeting points between the rim strip 6 and the outer wall of the inner tube 1 lie in a position adjacent to the beads of the tire. Also, this junction should lie between the seat of the rim and the outer diameter of the flange of the rim. This zone is indicated by a dimension "B" in Fig. 2. The reason for limiting the location of this junction is that it is essential that the strain resisting portion of the inner tube as defined by the plies 2 and 3 should extend from bead to bead of the tire and lie within that zone in which no flexing of the tire occurs while in operation. The distance represented by the letter "B" indicates this non-flexing zone.

It is also usually desirable that the fabric plies 2 and 3 continue beyond the junctions 7 and 8 so as to constitute the free or loose ends 4 and 5 or, at least, so as to constitute relatively free continuation portions which are not directly attached (beyond the junctions 7 and 8) to the base wall, or rim area, of the tube. This eliminates an abrupt junction between the strain resisting plies 2 and 3 and the extensible rim strip or base wall 6. By forming the junctions 7 and 8, in effect, along the wall of the ply 2, it is possible to form a better attachment of the rim strip 6 to the outer wall. Furthermore, by this arrangement there is less relative movement at the junction with the result that localized strains are reduced so as to prevent failures at this location. As shown in Fig. 1, the plies 2 and 3 overlap as they lie within the free ends 4 and 5. The purpose of this overlapping or offsetting is to permit a more gradual tapering of the free edges and to eliminate a more abrupt ending of the reinforcing elements.

Fig. 3 illustrates a modification of my invention and shows an inner tube 11 having plies 12 and 13 of strain resisting elements constituting the principal wall of the inner tube. The walls of the tube terminate in free ends 14 and 15 at the rim region. This modification is essentially the same as that shown in Fig. 1 with the exception that a rim strip 16 of extensible rubber composition is attached to the inner wall of the tube in place of the outer wall of the inner tube. Otherwise the general characteristics of the tube including the dimension "C" is the same as the corresponding features of the tube shown in Fig. 1. Thus, the strip 16 constitutes what may be termed a base wall of the tube that is attached at each of its ends to the sidewall at a definite junction. The opposite free ends 14 and 15 of the inextensible reinforcement continue from the junction of the sidewall with the base wall and such free ends may be regarded as essentially unattached members having no adherence to the base wall, except at the ends of the base wall, where the base wall becomes contiguous with the sidewalls. The advantage of attaching the rim strip 16 to the inner wall of the tube is to permit the strain resisting free ends 14 and 15 to lie against the junction formed by the tire bead and the rim with which it is associated. Ordinarily, there is a slight relative movement between the tire bead and the rim while the tire is in operation. For this reason, the double wall at that junction reinforces the tire assembly at a most critical point thus reducing tire failures. Also, the free ends are not under tension and serve better to resist chafing in this locality.

An inner tube of the principal embodiment of my invention, and as illustrated in Fig. 1, is manufactured in accordance with the steps illustrated by Figs. 4 to 8, inclusive. Fig. 4 shows the make-up of the two plies 2 and 3. Essentially, these plies are formed of layers of cord fabric 17 and 18 in which the cords are spaced 35 ends per inch. Each cord is formed of plied yarn and made from nylon filaments in which the cord has a gage of .020 and having a strength of approximately 25 pounds. A cord of this kind provides a high strength while at the same time permitting the wall of the tube to be relatively thin. It is important that the wall of the tube be relatively thin in order to minimize heat build-up. In general the gage of the cord before it is rubberized is preferably within the range of from 0.015 to 0.028, such gage permitting the desired thin wall thickness.

While cords formed of nylon are preferable, satisfactory results may also be obtained by utilizing other strain resisting elements such as cotton, rayon, or steel. The direction of the cords of fabric 17 and 18 are diagonal in respect to a circumferentially extending center line. More specifically, the cords lay at an angle so that after the shaping operation hereinafter described the cords will constitute an angle of approximately 50°.

In accordance with customary procedure in tire manufacture, the cord fabrics 17 and 18 are solutioned with rubber and thereafter a layer of rubber composition is applied to both surfaces of each of the fabrics 17 and 18. For example, a layer of rubber composition 19 of a gage of .015 inch is applied to the underside of the fabric 17 and a layer of rubber composition 20 of a gage of .045 inch is applied to the outer side of the fabric. A layer of rubber composition 21 of .015 gage is applied to the outer side of the fabric 18 while a layer of rubber composition 22 of a .045 gage is applied to the underside of the fabric 18. With the cord fabric thus encased in layers of rubber composition, the two plies 2 and 3 are assembled together in overlapping relation and in band form as shown in Fig. 4. The purpose of the overlapping relation is to permit a better tapering of the free edges as shown in Fig. 1. While it is preferred to use two plies in order to obtain adequate strength without excessive thickness, in some cases, particularly in tubes intended for heavy service, 3 plies or more may be employed if desired.

To complete the band assembly, two strips 23 and 24 are applied to the outer surface of the outer ply 2. These strips are intended to increase the thickness of the ply at specific circumferential regions in order to serve as a buffing strip as hereinafter described.

When the two plies 2 and 3 are thus assembled, they are placed on a drum as shown in Fig. 5 for the purpose of expanding the assembled layers and shaping them closely to the conformity of an annulus. The drum illustrated diagrammatically comprises end members 25 and 26 having a cylindrical cover 27. An expansible air bag 28 is positioned centrally on the drum, and the plies 2 and 3 are positioned over the drum and over the air bag. A hand hole 29 through the end member 25 permits an operator to inflate the air bag by means of the air bag valve 30. As a result of the inflation, the air bag blows circular in cross-section and the assembled plies 2 and 3 are shaped as shown by the dot and dash lines. Preferably the air bag 28 includes reinforcing cords so as to better control its uniformity of expansion.

While I have shown a special means for shaping the plies 2 and 3, it is to be understood that various methods of shaping may be employed. For example, the plies may be shaped in a vacuum apparatus such as used in the conventional shaping of pneumatic tires. After allowing the assembly to be held in this expanded shape for a few moments, the air bag is deflated and the assembled plies are removed from the drum. Thereafter a flexible curing bag 31 (Fig. 6) is collapsed and inserted into the partially shaped and assembled plies 2 and 3. Next the curing bag with the plies assembled thereon is placed in a vulcanizer and the plies are vulcanized. When the curing bag is removed, the plies 2 and 3 and the associated components form an integral unit constituting an annulus having a circular cross-section and having open free ends in the region of the rim. This completed unit of the assembly is shown in Fig. 7.

During the curing operation the strips 23 and 24 merge with the wall of the inner tube and form circumferentially extending bumps or ridges 32 and 33, respectively. The purpose of this additional material is to provide a thicker stock at this location which forms the junction to which the rim strip 6 is attached. Because the main body of the tube is vulcanized prior to its assembly with the rim strip 6, it is necessary in order to obtain good adhesion, to buff a circumferential strip as defined by the ridges 32 and 33. When the buffing operation is completed, cement is applied to that area and the rim strip 6 is assembled, with its marginal portion in contact relationship.

In order to prevent adhesion between the free ends 4 and 5 of the tube with the rim strip, that portion of the rim strip or of the free ends of both, may be coated with a non-adherent material such as soap stone or the like, thus preventing adhesion during vulcanization. In accordance with conventional practices, a valve stem (not shown) may be attached to the rim strip 6. When this operation is completed, the assembly is again placed into a mold and the tube is vulcanized. The resulting assembly is illustrated in Fig. 1.

When the tube is completed, its outer appearance is not readily distinguishable from the conventional tube. Its total wall thickness is in the order of 0.15 inch and it may be even less than this dimension. Usually the total wall thickness of the tube is within the range of from 0.08 inch to 0.2 inch. Therefore the heat build-up in the tube is not excessive, even though the tube includes fabric reinforcing elements.

In another form of the invention, I provide the reinforced tube with an integral envelope, usually on the inside of the tube, composed of a flexible material having high resistance to air leakage, such as butyl rubber, that is, a rubbery copolymer of a major proportion of a monoolefin, e. g., isobutylene, with a minor proportion of a conjugated 1,3-diene, e. g., isoprene. Such an air-retentive envelope, in combination with a fabric reinforced laminated structure composed of strong abrasion-resistant material on the outside of the tube, provides for high strength without air leakage. Figs. 9, 10 and 11 illustrate this modification of the invention.

Referring to Fig. 9 a rim 34 of a wheel is shown with a tire 35 mounted thereon and containing a reinforced composite inner tube 36. The tube 36 itself is composed of an internal envelope or liner 37 of air-retentive composition such as butyl rubber. Two reinforcing plies, or strain resisting elements 38 and 39 composed of filaments, such as nylon, and a rubber composition laminated thereto as described previously, form a band constituting the inextensible portion of the tube, and are superimposed on and adhered to the air-retentive tube liner 37 over the greater portion of its circumference. The ends 40 and 41 of the inextensible portion are free from direct attachment to the surface of the liner 37 over the rim area 42 of the liner 37, but, instead of being left entirely free as in the previously described forms of the invention, they are joined together by a highly extensible flap, or second rim portion 43. The purpose of the additional rim portion 43 is to maintain the relatively free ends 40 and 41 in proper position and to prevent them from becoming folded or otherwise improperly displaced when the tube is mounted on a wheel. It should be noted, however, that the extensions 40, 41 of the inextensible reinforcement constitute continuation portions that are free from attachment to the base wall 42, except at the junctions 44, 45 where the reinforcement is secured at the ends of the central base portion 42. The ends 40, 41 of the reinforcement are thus analogous to the free extensions 4, 5 on the interior of the inner tube in the form of the invention shown in Fig. 1, and the ends 40, 41 are also analogous to the free extensions 14, 15 in the form of the invention shown in Fig. 3. In all cases, the extension portions will be seen to have no attachment to the base wall of the tube beyond the critically located junction points.

As is disclosed in more detail in my U. S. Patent No. 2,550,193 such a connecting rim strip is highly advantageous in association with any form of inner tube including protective rim flaps, positioned similarly to the flaps or ends 40 and 41 of the present tube construction. The rim strip 43 is preferably made relatively highly extensible, particularly in its medial zone, compared to the remaining portions of the tube, including the upper rim area, or strip 42 of the air-retentive envelope 37. In order to be highly extensible the rim strip 43 may be made relatively thin, especially over its medial portion, or it may be composed of elastic stock of low modulus, or both of these expedients may be employed. The extensibility of the strip 43 may also be increased by providing holes or slots in the strip, thereby weakening it mechanically so that it is more easily stretched. As a result of the ease of extension of the rim strip 43, particularly at its central zone, the rim strip readily elongates to fit into the rim well of the wheel when the tube is inflated, without placing any appreciable stress on the free ends 40, 41, as is explained in more detail in the patent referred to above. In this way, the free continuation portions 40, 41 are enabled to remain substantially relaxed in the assembly, and the ends of the inextensible textile plies therefore do not bear any of the inflation stress. This feature of the present construction is of paramount importance, since, as pointed out previously, such free ends of the inextensible portion make possible the reduction of localized strains at the critical junctions with the extensible portion of the tube, and such free ends, when arranged as described, also minimize movement in the area of the junctions. These results could not be accomplished if the ends of the inextensible members were connected together in the rim area by a member that bore the stress of inflation and transmitted such stress to the end portions of the inextensible members.

As indicated in Fig. 10, the air-retentive liner 37 of the tube 36 is provided with the usual valve stem 50 suitably adhered to the rim area 42 thereof and passing freely through a hole 51 in the rim strip 43.

An inner tube of the character shown in Figs. 9 and 10 may be manufactured by first forming the liner tube 37, preferably from butyl rubber, in the same manner that a conventional inner tube is made. That is, the liner 37 may be extruded in tubular form, and may then have a valve stem 50 associated therewith as indicated in Fig. 10 and may be spliced, shaped, and vulcanized in the same manner that a conventional inner tube is made. The outer surface of the liner tube 37 is then buffed to promote adhesion of the subsequently applied parts of the assembly.

A rim strip 43 of the character indicated in Fig. 11, having a highly extensible medial section and being made either of the same composition as the tube 37, or of a different suitable elastic composition, may be formed by extrusion. A hole 51 for the valve stem 50 is die cut in this strip. Rubber cement is applied to the edges 44 and 45 of the strip, and the medial zone of the strip is painted with an adhesion-preventing substance so that the strip will not be joined to the tube except at its edges. The ends of the strip are spliced together to form an annular band, and this band is applied to the inflated liner tube, which has previously been coated with rubber cement over the areas where the edges 44 and 45 of the rim strip contact the tube. The attachment of the marginal areas of the rim strip to the liner tube is not permanent, because the contacting faces of these elements were not buffed.

The strain resisting outer portion of the tube 36 comprising laminated plies 38 and 39 may be built up in annular band form in the manner previously explained. This band may be applied to the previously cured butyl liner tube 37 by the method illustrated in Fig. 5, and described previously. Alternatively, the band may be associated with the liner tube with the aid of a vacuum shaping box having a suitably shaped toroidal cavity. The band is shaped in generally toroidal form with the aid of such a shaping box, and the uninflated liner tube is then disposed within the band. The liner tube is first dusted with zinc stearate to aid in the assembly operation. The zinc stearate does not interfere with subsequent formation of a proper bond between the liner tube and the reinforcing plies. The liner tube is then inflated within the band and the assembly is removed from the vacuum former. In completing the final assembly the edges of the plied band are tacked down around opposite sides of the inflated liner tube so that they overlie the edges 44 and 45 of the rim strip in the manner illustrated by Figs. 9 and 10. The whole assembly is thereafter subjected to vulcanization in the conventional manner. During the vulcanization the strain resisting band becomes firmly and integrally united to the outer crown and sidewall surfaces of the liner tube 37, which surfaces were previously buffed, as well as to the outer marginal surfaces of the rim strip 43. The rim strip is itself free from attachment to the liner tube, since the bond formed when the edges 44, 45 of the uncured rim strip were pressed against the cured liner tube was only a temporary bond that did not persist through cure of the assembly.

The advantages of such a composite tube have been well demonstrated and the two additional plies constituting the tube itself increase the carcass strength of the tire by approximately 50%. When nylon is used as the strain resisting element, this strength is still higher relative to the carcass. When steel cord is used in the inner tube, the strength of the tube becomes even greater than the strength of the tire carcass. Therefore, the protective value of the inner tube is evident in that it will retain the inflated condition of the tire notwithstanding complete failure of the tire itself.

Many tests have been made to determine the practicability and performance of the inner tube of my invention. For example, in one of these tests an inner tube was mounted in a 6.50-16 tire casing having a rupture extending through the tire carcass in the form of a letter "X" and the size of the rupture was 2½ inches by 2 inches. This tire was driven a distance of 96 miles before the operator became aware of a bumping of the tire. The vehicle was driven at the rate of 70 miles per hour on a paved road. At 117 miles the tire started to throw its tread and at this point the tube failed and the deflation of the tube was sufficiently slow to permit the vehicle to be easily handled until reaching a complete stop. An inspection of the tire showed that a fabric break extended 2 inches above the bead around the tread of the tire and to a point 2 inches above the opposite bead. Attempts have been made to repeat this test using conventional inner tubes and using a similar ruptured casing having a break size of 2½ inches by 2 inches. The tire ran only 34 miles before the tube failed completely, and without warning causing the vehicle to swerve badly. An inspection of the tire showed that the size of the rupture had increased to 3 inches by 2 inches.

In order to show the advantages of the present tube in connection with its puncture resisting characteristics, a tire having a tube of my invention was punctured by forcing into the casing and through the tube a nail of a diameter of .134 inch. This tire was driven a distance of 330 miles at from 45 to 50 miles per hour without failure and without loss of air. Similar tests were conducted using nails having diameters of .148, .164, .209, .229, .248 and .265. In each case the tires were driven a distance of 330 miles without failure or deflation of the inner tubes. Using a conventional inner tube and with a nail of the size .134 driven into the tire and through the inner tube, the tube was completely deflated after driving the vehicle 19 miles. The inner tube of my invention has demonstrated its resistance to punctures and its capability of supporting a damaged casing with its consequent beneficial result to the protection of the tire casing and inner tube and to the vehicle and its occupants.

While reference is made to rubber and rubber compositions, it is to be understood, as indicated previously, that the invention contemplates synthetic rubber as well as natural rubber. By synthetic rubber I refer to those modified butadiene-1,3-derived rubber materials which lie within the class of neoprene (polychloroprene), Buna S (rubber copolymer of butadiene-1,3 and styrene), Buna N (rubbery copolymer of butadiene-1,3 and acrylonitrile), butyl (rubbery copolymer of a major proportion of a monoolefine, e. g., isobutylene, with a minor proportion of a conjugated 1,3-diene, e. g., isoprene). In addition of the foregoing compositions, I may employ other suitable elastic materials, particularly in the relatively inextensible portions of the tube, such as plasticized nylon, plasticized polyvinylchloride, polymerized alkyl acrylates, and similar flexible materials having some degree of resilience or rubbery characteristics.

Having thus described my invention, what I claim and desire to protect by Letters Patent is:

1. An annular toroidal inner tube for a pneumatic tire comprising an air chamber formed of a crown wall, sidewalls and a base wall, all of the said walls being made of air-impervious rubber composition, an exterior inextensible reinforcing covering comprised of a plurality of plies of rubberized fabric extending continuously over the entire said crown wall, over the entire said sidewalls, and partially over the said base wall, the said plies constituting a complete circle annularly of the tube, but less than a complete circle in transverse cross-section so that opposite terminal ends of the said plies are located at spaced points in the base area, the said inextensible covering being integrally united to the entire crown wall and integrally united to the entire sidewalls as far as definite junctions located where the said sidewalls merge with the ends of the said base wall, the remainder of the inextensible covering being free of attachment to the said base wall beyond the said junctions, said remainder of the inextensible covering thereby constituting essentially loose continuation portions containing the said terminal ends of the reinforcing plies, the said junctions between the said inextensible continuation portions, containing the said reinforcing plies, and the tube wall being located within non-flexing zones corresponding to the areas of the tube adjacent to the bead portions of a tire in which the tube is mounted, the portion of the base wall between the said junctions constituting a thin, readily extensible and flexible sector of the tube amounting to 13% to 20% of the cross-sectional perimeter of the tube, as measured with the tube slightly inflated and unmounted, such extensible sector being free of inextensible reinforcement and serving for expansion of the tube into the rim wall of a wheel upon which the tube is mounted upon application of an inflating medium within the tube, the said loose continuation portions of the inextensible covering serving to distribute stresses exerted upon the said junctions when the tube is in use within a tire, and an additional exterior rim strip of rubber composition attached to the said inextensible continuation portions and extending across the base area from one of the said inextensible continuation portions to the other to keep the said inextensible continuation portions in proper position, the said additional rim strip and inextensible continuation portions constituting an assembly free of attachment in the central base area of the tube located between the said junctions, the said additional rim strip being highly extensible over its central portion so that upon inflation of the tube the said inextensible continuation portions remain in a substantially relaxed state.

2. A reinforced composite tube for use with a conventional pneumatic tire having a body formed of rubberized plies of relatively inextensible strain-resisting elements, and a standard drop-center type rim upon which said tire is mounted, said composite tube comprising a tubular liner of extensible air-impervious material, and an exterior reinforcing covering of rubberized fabric comprising cords of nylon having a crown cord angle of at least 50° with respect to the circumferential center line of the tube, said reinforcing covering being of substantially uniform thickness and extending over the crown and sidewalls and partially over the rim area of said tubular liner, and forming less than a complete circle in transverse cross section, whereby the ends of said reinforcing covering are spaced apart at the rim area of said tubular liner and terminate within a zone defined by the outer diameter of the rim flange and the bead seat of the rim, said reinforcing covering being integrally united with said tubular liner throughout the greater portion of its circumference with the terminal ends thereof free from attachment thereto, the rim area of said tubular liner which is unattached to said reinforcing covering being free to expand into the well of the rim upon inflation of the tube while the remaining portion of the composite tube lies against the inner wall of the tire in a substantially unstretched condition, and an extensible rim strip, free from attachment to the rim area of said tubular liner, connecting the free ends of said reinforcing covering.

3. A reinforced composite tube as in claim 2, in which the wall thickness of the said tube is within the range of from 0.08 inch to 0.2 inch, and in which the said unattached rim area of the tubular liner comprises 13% to 20% of the cross sectional perimeter of the said composite tube.

4. A reinforced composite tube for use with a conventional pneumatic tire having a body formed of plies of strain-resisting elements, and a standard drop-center type rim upon which said tire is mounted, said composite tube being adapted to reinforce and strengthen said tire from bead to bead and bridge ruptures occurring in the plies of the tire body and comprising, a tubular liner of extensible air-impervious material, and an exterior reinforcing covering comprised of rubberized strain-resisting cord fabric extending over the crown and sidewalls and partially over the rim area of said tubular liner, and forming less than a complete circle in transverse cross section, whereby the ends of said reinforcing covering are spaced apart at the rim area of said tubular liner, said reinforcing covering being integrally united with said tubular liner throughout the greater portion of its circumference with the terminal ends thereof free from attachment thereto, said free ends lying adjacent the beads of the tire in the non-flexing zone of the tire, the rim area of said tubular liner between the terminal ends of said reinforcing covering being free to expand into the well of the rim upon inflation of the tube while the remaining portion of the composite tube lies against the inner wall of the tire in a substantially unstretched condition, and an extensible rim strip, free from attachment to the rim area of said tubular liner, connecting the free ends of said reinforcing covering, and adapted upon inflation of the tube to expand into the rim well without transmitting appreciable inflation stresses to said reinforcing covering.

References Cited in the file of this patent

UNITED STATES PATENTS

| | | |
|---|---|---|
| 1,279,001 | Rawdon et al. | Sept. 17, 1918 |
| 1,332,309 | Sawyer | Mar. 2, 1920 |
| 1,424,135 | Orr | July 25, 1922 |
| 1,431,596 | Pixley | Oct. 10, 1922 |
| 1,474,085 | Meredith | Nov. 13, 1923 |
| 1,522,805 | Chappell | Jan. 13, 1925 |
| 2,169,041 | Gammeter | Aug. 8, 1939 |
| 2,194,341 | Voorhees | Mar. 19, 1940 |
| 2,231,182 | Eger | Feb. 11, 1941 |
| 2,233,004 | Fisher | Feb. 25, 1941 |

FOREIGN PATENTS

| | | |
|---|---|---|
| 26,303 | Great Britain | 1909 |
| 28,832 | Great Britain | 1909 |
| 30,300 | Great Britain | 1909 |
| 161,757 | Germany | July 8, 1905 |

OTHER REFERENCES

"Tires," December 1945, page 35.